May 16, 1933. W. O. AMSLER 1,909,902
GLASS POLISHING APPARATUS
Filed Feb. 1, 1926 4 Sheets-Sheet 1
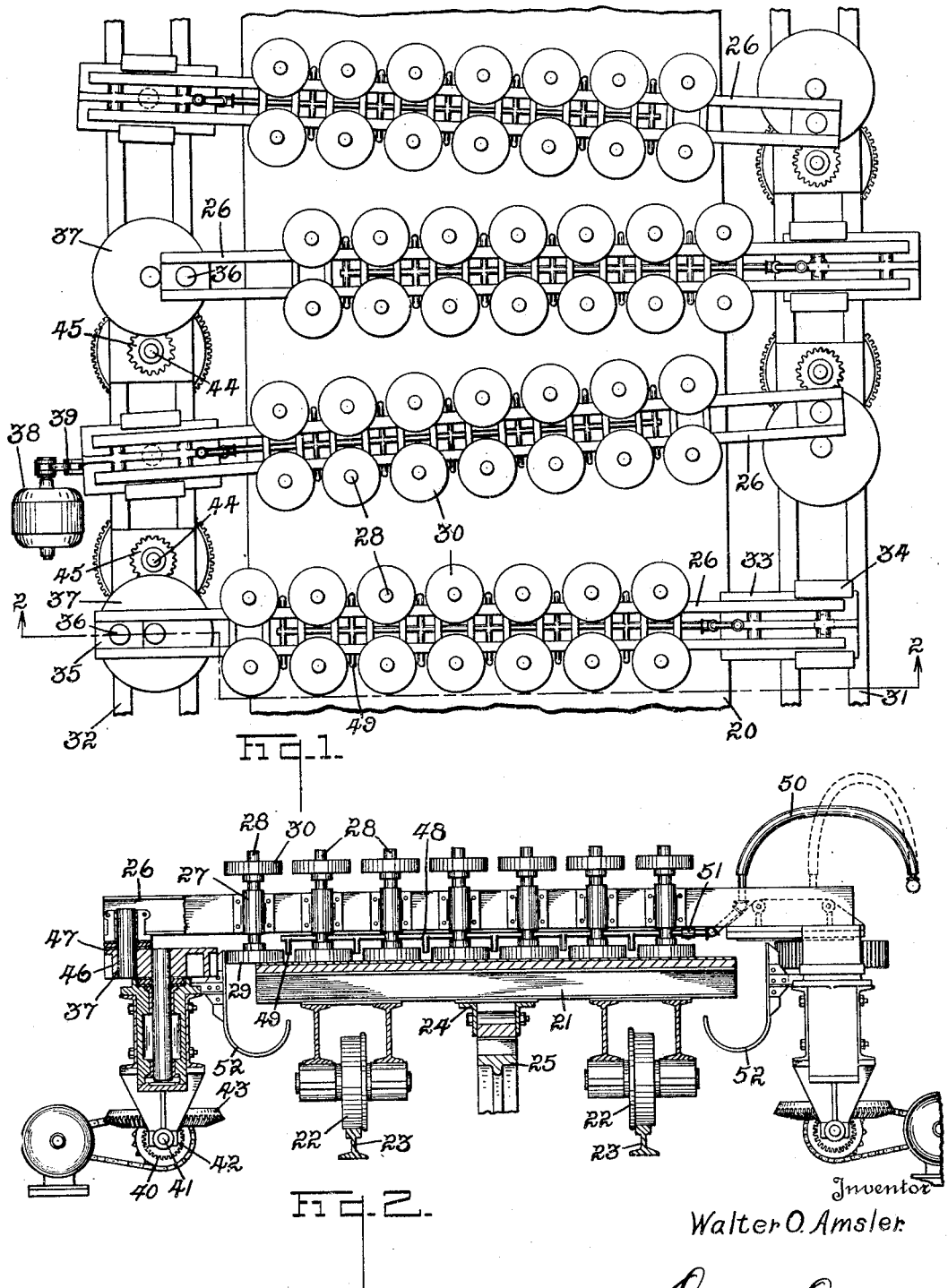
Inventor
Walter O. Amsler
By Owen & Owen
Attorneys.

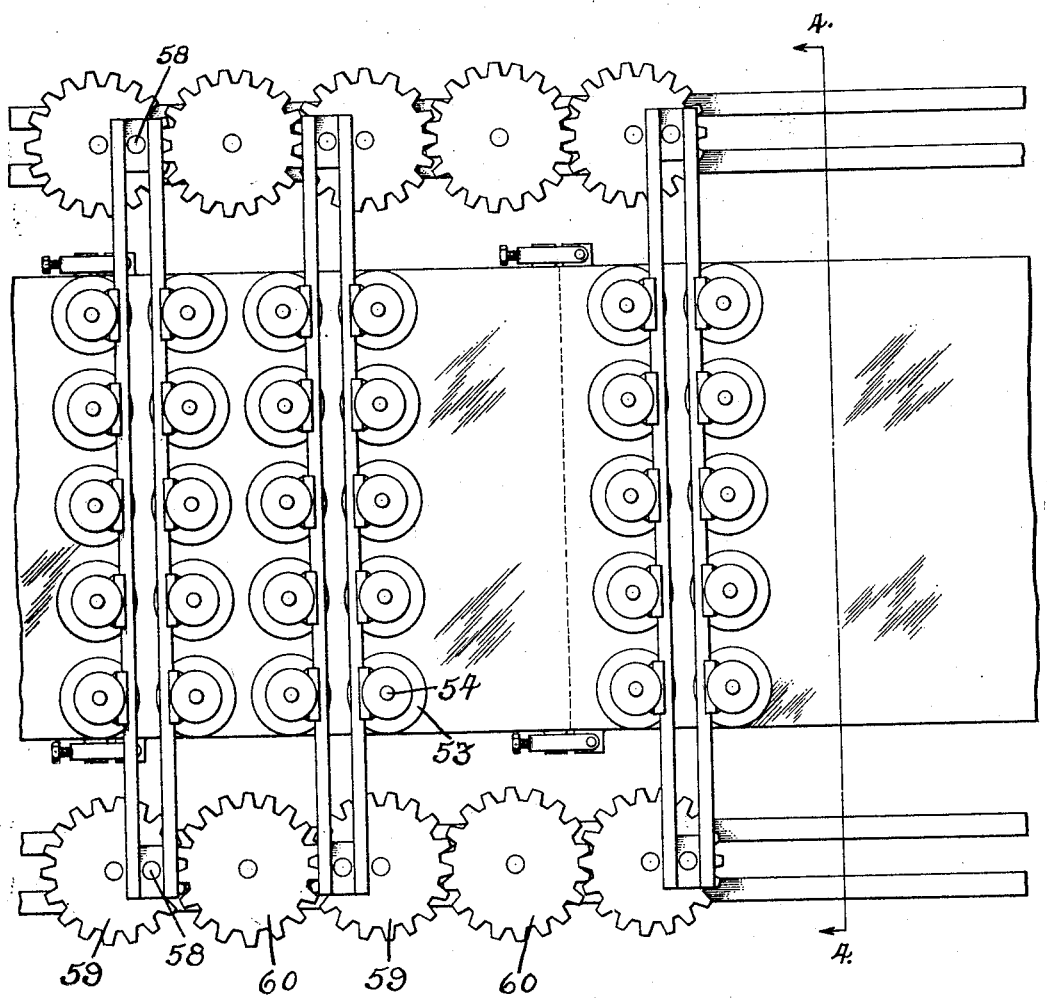

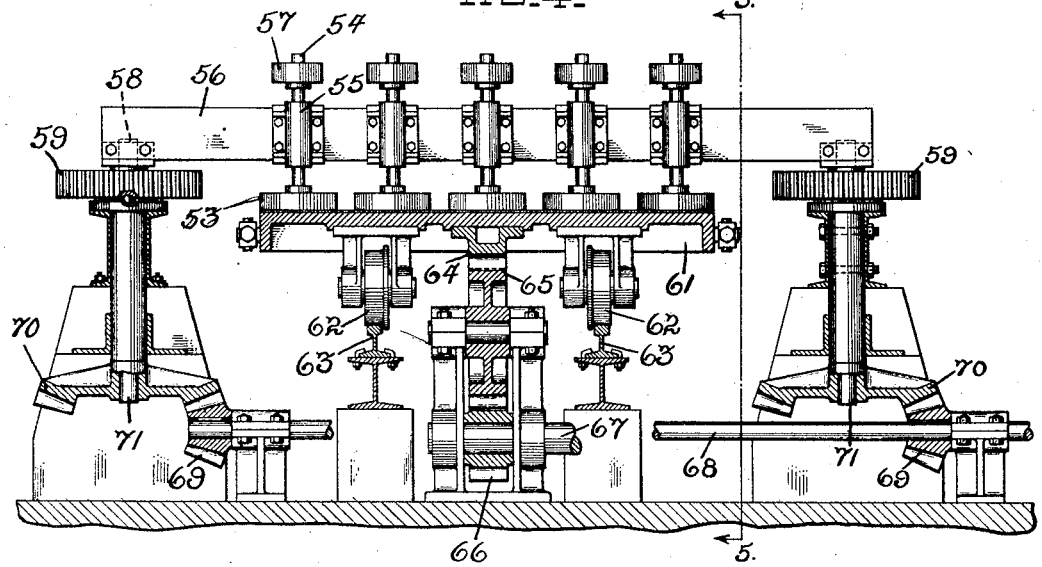
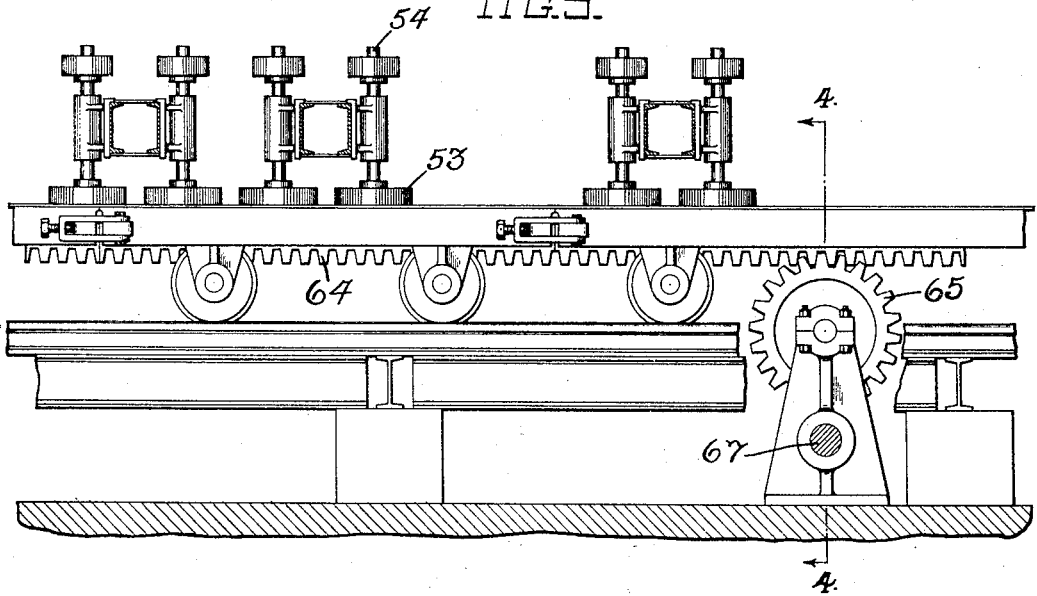

May 16, 1933.  W. O. AMSLER  1,909,902
GLASS POLISHING APPARATUS
Filed Feb. 1, 1926    4 Sheets-Sheet 4
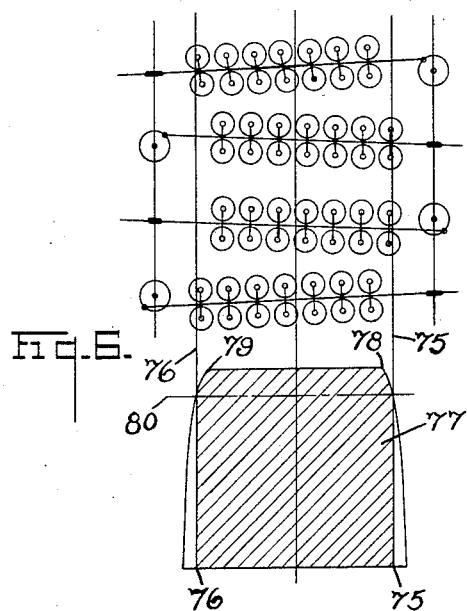
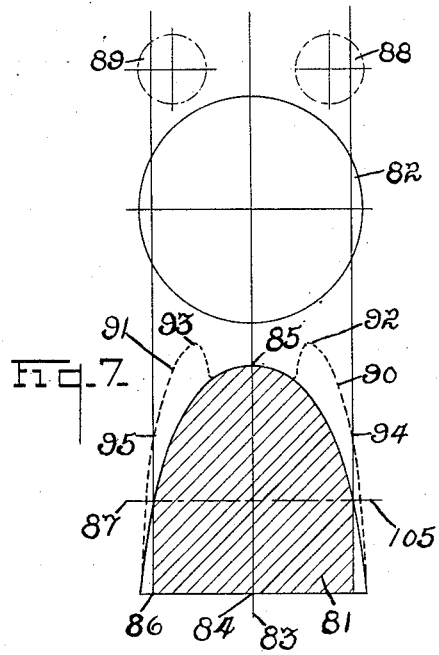
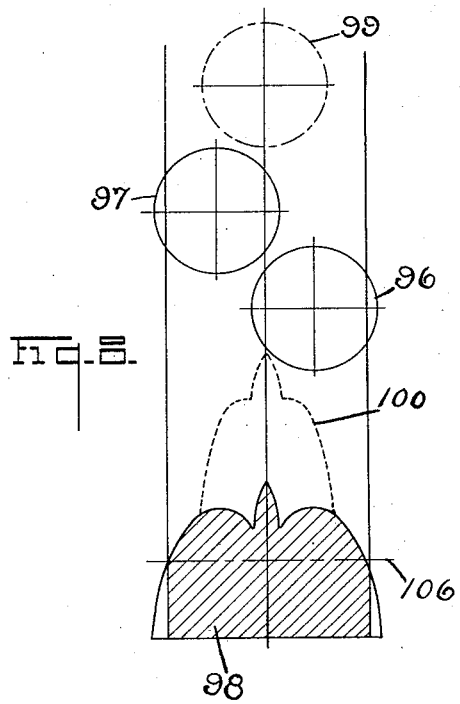
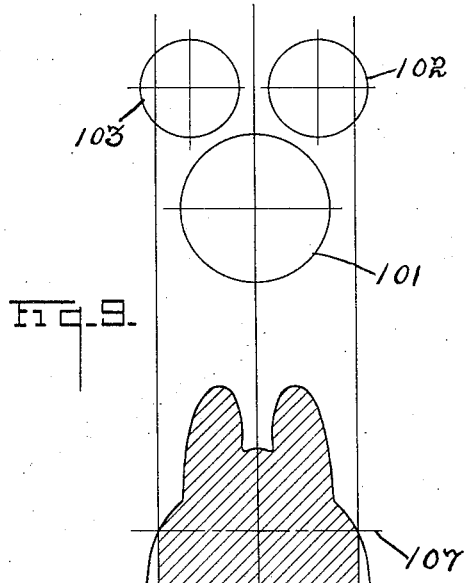
Inventor
Walter O. Amsler
By Owen & Owen
Attorneys.

Patented May 16, 1933

1,909,902

UNITED STATES PATENT OFFICE

WALTER O. AMSLER, OF TOLEDO, OHIO, ASSIGNOR TO SIMPLEX ENGINEERING COMPANY, OF WASHINGTON, PENNSYLVANIA, A CORPORATION OF DELAWARE

GLASS POLISHING APPARATUS

Application filed February 1, 1926. Serial No. 85,318.

My invention relates to apparatus for polishing glass. More particularly, my invention relates to apparatus by which glass is polished while it is being continuously advanced. The essential features, as well as improved details, of my invention, will appear as the description proceeds.

In the accompanying drawings, forming a part of this specification, Figure 1 is a somewhat diagrammatic plan view of a portion of one form of apparatus embodying my invention; Fig. 2 is a view substantially on the line 2—2, Fig. 1; Fig. 3 is a plan view of an alternative form of apparatus for polishing glass; Fig. 4 is a section on the line 4—4 of Figs. 3 and 5; Fig. 5 is a partial longitudinal section on the line 5—5 of Fig. 4, particularly showing the means for conveying the glass; Figs. 6, 7, 8 and 9 are diagrammatic views indicating the grinding action of different arrangements of runners.

Referring first to the apparatus shown in Figs. 1 and 2, it will be noted that a sheet of glass 20 is supported upon a series of traveling tables 21, supported by wheels 22 running upon tracks 23. The tables may be provided on their underside with racks 24 adapted to be engaged by one or more driving gears 25 operated in any suitable manner. In this way the glass is propelled continuously along a path longitudinal thereof.

A series of carriers 26 is provided above the path of the glass. Each carrier 26 has attached to each side thereof a series of boxes 27 through which pass vertical shafts 28. The lower end of each shaft 28 is provided with a polishing runner 29, while a weight 30, substantially of the same weight as the runner, is attached to the upper end of each shaft, and the distance of the weight from box 27 is substantially equal to the distance of the runner from the box.

On the two sides of the path of the glass there are supporting members 31, 32. Each carrier 26 has a slide 33 operating in a slideway 34 at one end, and has a box 35 surrounding a wrist pin 36 on a driving disk 37 at the other end. Successive carriers 26 are operated from opposite ends.

In the drawings there is shown a motor 38 connected by a sprocket chain 39 to a sprocket wheel 40 on a shaft 41 parallel with the path of movement of the glass. Each end of the shaft 41 is provided with a bevel gear 42 meshing with a gear 43 on the lower end of an upright shaft 44. The upper end of each shaft 44 is provided with a gear 45 meshing with teeth 46 upon a crank disk 37. In the construction shown, each crank disk 37 is provided with a flange 47 which overlies its teeth and aids in keeping dust or grit from entering between the teeth. Both bevel gears 43 on a shaft 41 may mesh with the sides of adjacent gears 43 nearest to sprocket wheel 40. In this case the two disks 37 driven from a motor 38 will turn in opposite directions. Shaft 41 may be continued past the center of one wheel 43, and the cooperating gear 42 may mesh with the side of that gear 43 farthest from sprocket wheel 40, in which case disks 37 driven from a motor 38 turn in the same direction. This is preferable for some purposes, as it results, when the crank pins 36 on the two disks 37 are positioned 180° apart, that such crank pins are always moving in exactly opposite directions, so that their movements will balance each other.

The polishing material may be fed to the device in any desired manner, but a very desirable construction for this purpose is shown in Figs. 1 and 2. According to this construction a pipe 48 extends longitudinally of each runner 29 above the polishing runners and between the rows thereof. There are downwardly directed discharge nozzles 49 at intervals along this pipe. The pipe is supplied with a liquid, carrying rouge or other desired polishing material, through a flexible pipe 50 leading from any suitable source of supply.

I prefer to introduce a check valve 51 at the end of pipe 48 between that pipe and its source of supply. The valve is so constructed as to allow free passage of the material into pipe 48, but prevent the return of the material to pipe 50.

Preferably, guards or troughs 52 are attached to the frame on each side of the path of table 21 and extend under the edge of the table so as to catch the polishing or abrasive material dropping from the edge of the table. Troughs 52 may be flushed out, and the material caught in them returned for further use, if desired.

In the apparatus shown in Figs. 3, 4 and 5, another form of polishing device is shown. In these figures, there are polishing runners 53 supported upon the lower end of shafts 54, journalled in boxes 55, on carriers 56, the shafts being pressed downward by weights 57. So far as this portion of the structure is concerned, it is similar to that shown in Fig. 2. However, instead of being driven from one end only and sliding in a guideway at the other end, carriers 56 are carried by wrist pins 58, one at each end thereof. Wrist pins 58 extend upward from gear wheels 59 which rotate simultaneously and in the same direction, so that each box 55 is moved continuously in a circular path. In the construction shown in Fig. 3, gears 59 are connected by means of idlers 60. Where one idler is interposed between each pair of wheels 59, it is clear that all of the wheels 59 will rotate in the same direction. For some purposes it is desirable for successive wheels 59 to operate in opposite directions, so as to balance the strain exerted thereby, in which case two idlers would be used between each pair of wheels 59; but ordinarily the structure shown is preferable. It will be seen that adjacent carriers are carried on relatively opposite sides of their operating gears, so that they are always moving in opposite directions.

In this construction there is a series of tables 61 similar to tables 21. These tables are supported by wheels 62 running upon tracks 63. Racks 64 are attached to the undersides of the tables, the racks being engaged by a gear wheel 65 which meshes with a gear 66 upon a transverse shaft 67 driven from any suitable source of power.

In this construction the idlers might be omitted and the alternate pairs of wheels 59 driven in the same manner as disks 37 shown in Fig. 1; but in that case it would be practically necessary to drive each pair of alternate gears 59 through means directly connecting with the driving means for the corresponding gears at the other ends of the respective carriers, as it is absolutely necessary that the two gears 59 at the opposite ends of any carrier shall rotate in unison. In the construction shown, one transverse shaft 68 is driven from any suitable source of power. This shaft 68 carries two bevel gears 69, one on each side of the path of the glass. This shaft is conveniently located beneath rails 63. The bevel gears 69 mesh with gears 70 on the lower ends of shafts 71. The shafts 71 carry on their upper ends the gears 59 connected with a carrier 56. In this way these gears 59 are directly driven in unison, and from these gears 59 as long a train of gears 59 with intermediate idlers may be driven as is considered desirable.

The general operation of the apparatus will be readily understood from the above disclosure. The glass is moved slowly beneath the polishing devices, which operate upon it in succession. It will be readily observed that a considerable portion of the surface of the glass is subjected to rubbing at any given time. The rapidity with which the carriers 26 can be moved is appreciably increased by having the weights 30 above the carriers substantially counterbalance the runners 29 below the carriers, so that there is comparatively little tendency for the carriers to be tipped out of position. The rapidity with which the operating disks may be revolved is limited by the strain exerted thereon in changing the direction of movement of the carriers. Inasmuch as the rubbing of the runners upon the glass reduces the momentum of the carriers, the rotation of disks 37 may be more rapid than would be advisable if there were no glass in contact with the runners.

The operation results in moving the runners in all directions across the glass, and thereby avoids streaks due to the peculiarities of any particular runner. Furthermore, as each runner is moved at each revolution of the operating disk 37 a distance greater than the diameter of the runner, the same grinding powder is not retained under a runner, a feature which assists in the uniform polishing of the glass.

While the polishing material may be applied to the glass in other ways, the method indicated in Figs. 1 and 2 has advantages. It will be noted that when carrier 26 moves to the left, as viewed in Fig. 2, the contents of pipe 48 will be given momentum to the left. When the carrier reaches the position shown in Fig. 2, the contents of pipe 48 tends to continue its movement to the left, and, therefore, exerts pressure due to this fact tending to drive it out of nozzles 49 at the left end of pipe 48. When carrier 26 moves to the right, this same tendency to force the contents of the pipe out of the nozzles at the left end thereof continues until momentum has been imparted to the pipe and its contents. After carrier 26 has reached its maximum speed to the right and begins to slow down, the contents of pipe 48 tends to move to the right more rapidly than the pipe. This will close check valve 51, and result in extra pressure upon the nozzles at the right end of pipe 48. In this way extra pressure is brought to bear upon the contents of pipe 48 in first one end and then in the other end thereof, which equalizes the flow from the several nozzles and at the same time tends to prevent their becoming clogged. Furthermore, this reciprocating movement of contents of pipe 48 may be used to assist in pumping material into the pipe through flexible connection 50.

When such a polishing device is operated at the maximum permissible speed, the glass becomes heated. If several consecutive carriers were stopped or removed at the same time, this would allow an exposure of a considerable length of heated glass, and might result in injurious temperature changes. When the apparatus is constructed in accordance with the disclosure of Fig. 1, the carriers 26 driven from one motor 38 may be stopped and the carriers removed to make any necessary repairs without interfering with the alternately placed carriers 26. In this way only comparatively short portions of the glass are uncovered, which is a distinct advantage from the standpoint of maintaining the temperature of the glass approximately uniform.

It is necessary to continue the polishing of a sheet of glass until it is sufficiently polished at all points across its width. If it becomes polished at one place in its width before polishing is completed at another place in its width, there is no convenient way in which the necessary polishing may be completed without at the same time exerting an equal amount of unnecessary polishing upon the already polished portions. For this reason it is a great advantage to so arrange the polishing devices that the polishing is completed at all points throughout the width of the sheet at substantially the same time.

Fig. 6 shows diagrammatically the polishing effect of the arrangement of apparatus shown in Fig. 1. In this figure the sides of the glass sheet are indicated at 75 and 76. The end runners are moved beyond the edges 75 and 76 at certain times, but when this is done the weight of the entire runner rests upon that portion which is supported by the sheet. As the polishing action is directly in proportion to the weight pressing the surfaces together, this results in extra rubbing upon the edges of the sheet which largely counterbalance the time when the runners are moved in the opposite direction so that they do not rest upon the edge of the sheet. When the speed of motion and weight of the runners is considered, so that their polishing action is accurately calculated, it is discovered that their polishing effect may be indicated by the shaded portion 77 shown on Fig. 6. The greatest amount of polishing will result on a portion of the sheet between points 78 and 79 indicated on Fig. 6, but it will be seen that these points do not extend very far beyond the line 80 which represents the least amount of polishing upon any portion of the glass. In other words, the difference between the polishing effect of the apparatus diagrammatically indicated in Fig. 6 upon the central potion of the glass and the edge portions of the glass is indicated by the comparative distance between the bottom part of shaded portion 77 and the line between point 78 and 79 on one hand and the line 80 on the other hand.

Figs. 7, 8 and 9 are diagrammatic indications of other possible arrangements of polishing devices, with diagrammatical indication of the polishing effect thereof. In Fig. 7 the shaded portion 81 represents the polishing effect of one large runner 82 covering the entire sheet and lapping slightly beyond its edges. It will be seen that the polishing effect along the center line 83 as represented by the difference between points 84 and 85 is more than twice the polishing effect at the edges of the sheet as represented by the difference between points 86 and 87. This arrangement may be improved to some extent by using the additional small runners 88 and 89 indicated in dotted lines, which produce the additional polishing effect indicated by additional areas outlined by dotted lines 90 and 91. In this case the points 92 and 93 of greatest polishing action are a little less than twice as far from the base line as the points 94 and 95 where these areas cross the side lines of the sheet. It will be readily apparent, however, that this arrangement of runners still results in a great deal more needless polishing than the arrangement shown in Fig. 6.

In the arrangement shown in Fig. 8 there are diagrammatically indicated runners 96 and 97 which produce a polishing action indicated by the shaded area 98. While this is a better arrangement of runners than that shown in Fig. 7, it results in much more useless polishing than the arrangement shown in Fig. 6. The addition of another runner 99, indicated in dotted lines on Fig. 8, would add the polishing effect indicated by the area surrounded by dotted line 100 in that figure. It will be noted that this additional polishing would be entirely wasted.

The arrangement shown in Fig. 9, wherein one large polishing runner 101 is used in the center of the sheet and two smaller polishing runners 102, 103 are used on the edges would result in a polishing effect indicated by the shaded area 104. The indications as to effectiveness of the polishing action being the same as in the other figures, further description need not be made.

The arrangements of polishing runners shown in the four figures would have approximately the polishing effect shown in the relative shaded areas in the several figures. It will be readily understood that the rapidity of movement of the glass will be dependent upon the polishing effect at the least polished portions of the sheet, which are the edges in each of the examples given above. Therefore, the relative speed at which the sheet may be moved with the different arrangements of runners is roughly indicated by the distance between the base line in the respective figures and the line 80 in Fig. 6, line 105 in Fig. 7, and the line 106 in Fig. 8, and the line 107 in Fig. 9. The result is that the arrangement shown in Fig. 6 not only results in much less waste of power to produce the necessary polishing, but it also enables the sheet to be moved at a faster rate, or what amounts to the same thing, to be satisfactorily polished by apparatus operating upon a shorter length of the sheet.

It will be noted that the runners are given motion both transversely and longitudinally of the glass sheet. This is desirable for two reasons, first, because it results in greater travel of the runners and more rubbing action, second, because it moves the runners in constantly changing paths and tends to make the rubbing action more uniform.

While the apparatus has been described throughout as intended for polishing glass, and it is specially designed for that purpose, it might be used under appropriate circumstances to polish other materials, and some features of the invention are applicable to grinding as well as polishing operations.

While I have shown in some detail one form of my invention, and have indicated some ways in which some features of the invention may be modified, it will be understood that other changes may be made within the scope of my invention as defined in the appended claims.

What I claim is:

1. In apparatus for polishing sheet glass, means for moving a glass sheet longitudinally, a carrier arranged transversely above the path of the glass, means to move the carrier transversely of the glass, vertical shafts mounted rotatably and slidably in said carrier, polishing runners on the lower ends of said shafts in position to bear upon the surface of glass beneath the carrier, and weights on the upper ends of the shafts, each of said weights being substantially equal to the associated runner, and the distance of weight and runner from the bearing in the carrier being substantially equal.

2. In apparatus of the character described, means for moving a glass sheet longitudinally, a series of pairs of tool carriers arranged transversely above the path of the glass, means at one end of each carrier for moving said carrier transversely of the glass, alternate carriers being driven from opposite ends, and the carriers which are driven from the same end being divided into adjacent pairs, each pair being operated by a separate source of power and in opposite directions.

3. In apparatus of the character described, means for moving a glass sheet longitudinally, a series of carriers arranged transversely of and above the path of the glass, a series of polishing tools carried by each carrier, each tool being carried by an independently rotatable vertical shaft having a counterbalancing weight above the carrier, a slide for one end of each carrier, means to move the other end of each carrier in a horizontal circle, adjacent carriers having their opposite ends moved in circles, and means connecting pairs of operating devices on the same side of the sheet to move them in the same direction around their respective circles, but at 180° apart in their respective circles, so that they move in opposite directions at any given time.

4. In apparatus of the character described, means to move a glass sheet longitudinally, a pipe arranged transversely of and above the path of the glass, discharging nozzles along the pipe above the path of the glass, means to reciprocate the pipe longitudinally, one end of the pipe being closed, a supply connection at the other end of the pipe, and a check valve between the pipe and its supply connection admitting material from the supply to the pipe but preventing its return from the pipe to the supply, whereby the momentum of liquid in the pipe imparts hydraulic pressure to force material from the nozzles at each reversion of longitudinal movement of the pipe.

5. In apparatus of the character described, means for supporting a glass sheet, an elongated carrier positioned above the plane of the sheet, tools mounted on the carrier, a pipe mounted on the carrier having a series of discharge openings along its under side directed toward the glass, a supply connection at one end of the pipe, a check valve between the pipe and its supply connection admitting material to the pipe and preventing its return flow to the supply, and means for reciprocating the carrier longitudinally whereby the momentum of liquid in the pipe imparts hydraulic pressure to force material from the discharge openings at each reversion of longitudinal movement of the pipe.

6. In apparatus of the character described, means for supporting a glass sheet, an elongated carrier positioned above the sheet, a slide at one end of the carrier restraining that end of the carrier to a linear motion in a direction transverse of the sheet, means to move the other end of the carrier in a horizontal circle, tools carried by the carrier in position to contact the glass, a pipe carried by the carrier and having a series of nozzles directed downwardly towards the glass, a supply connection for the pipe at the end of the carrier mounted in the slideway and a check valve admitting material from the supply to the pipe but preventing return to the supply from the pipe, whereby the momentum of liquid in the pipe imparts hydraulic pressure to force material from the nozzles at each reversion of longitudinal movement of the pipe.

In testimony whereof, I have hereunto signed my name to this specification.

WALTER O. AMSLER.